United States Patent Office 3,515,695
Patented June 2, 1970

---

3,515,695
POLYDISALICYLIDE POLYMERS
Gerard A. Loughran, Kettering, and Jerald L. Burkett, Dayton, Ohio, assignors to the United States of America as represented by the Secretary of the Air Force
No Drawing. Filed Oct. 6, 1967, Ser. No. 674,066
Int. Cl. C08g 17/02
U.S. Cl. 260—47                                14 Claims

ABSTRACT OF THE DISCLOSURE

This invention comprises new polymers containing polydisalicylide linkages such as prepared from the condensation polymerization of 4,4' - diacetoxydiphenylether-3,3' - dicarboxylic acid, 4,4' - dihydroxydiphenyl-3,3' - dicarboxylic acid, or 2,5-diacetoxy derivative of terephthalic acid, or the corresponding acid chlorides. The polymerization proceeds through an initial linear polymer formation and then the second pair of functional groups from adjacent ring structures condense to form an eight-membered ring which gives the polymer a double strand structure which can be either of boat or chair configuration. The polymers of this invention have high thermal stability and are useful for producing molded articles, laminates, films, adhesives and ablative materials.

---

The invention described herein may be manufactured and used by or for the United States Government for governmental purposes without payment to us of any royalty thereon.

BACKGROUND OF THE INVENTION

Field of the invention

The present invention relates to new polydisalidylide polymers. More specifically, it relates to new aromatic polymers having ester and carboxy linkages in ortho position on an aromatic nuclei as part of an eight membered ring connnecting adjacent aromatic nuclei.

Still more specifically, it relates to new polymers derived from aromatic compounds having two pairs of functional groups, each pair consisting of a carboxylic and hydroxy group or derivative thereof, typical of which are 4,4' - diacetoxydiphenyl ether - 3,3' - dicarboxylic acid, 4,4' - dihydroxydiphenyl-3,3'-dicarboxylic acid, and the 2,5-diacetoxy derivative of terephthalic acid, or the corresponding acid chlorides.

Description of the prior art

Prior art workers have described various cyclic types of derivatives resulting from the heating under reduced pressure of acetyl salicyclic acid. These cyclic compounds have rings of from eight members, as in the disalicylide, up to 24 in the hexasalicylide. These can be represented by the formula

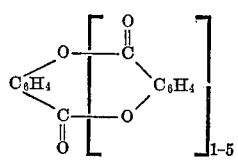

As the number of groups within the bracket is increased, the ring merely becomes larger.

These products are derived from a difunctional salicyclic compound. Moreover the repeating unit of such ring compounds have the formula

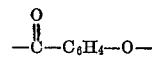

SUMMARY OF THE INVENTION

In accordance with the present inevntion, new polymeric composition having high thermal stability have been found which have a plurality of repeating units therein having the formula

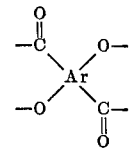

(Formula A)

In this formula each of the O groups is paired in ortho or peri position with a C=O group, and Ar, is a tetravalent aromatic radical selected from the class consisting of $>C_6H_2<$; $>C_{10}H_4<$; $>C_{14}H_6<$; $>C_6H_3—C_6H_3<$; $>C_6H_3—Z—C_6H_3<$; and

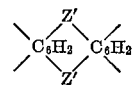

nuclear substituted derivatives of the foregoing in which there are no more than two derivative groups and each derivative group is selected from the class of Br, Cl, I and R; and fluoro derivatives of the aforementioned in which at least one and as many as all of the hydrogens attached to carbon are replaced by fluorine; wherein Z is a divalent radical selected from the class consisting of —O—;

—S—; —OSi(R)$_2$O—; —Si(R)$_2$—; —Si(OR)$_2$—;
—SO$_2$—;

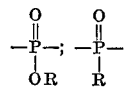

R'; —NH— and —N(R)—; the two Z' groups are positioned ortho to each other in each C$_6$H$_2$ nucleus and each Z' represents a divalent radical of the class consisting of —O—;

—S—; —NH—; —N(R)— and R'; R is a monovalent hydrocarbon group; such as alkyl, alkenyl, aryl, cycloalkyl, aralkyl, alkaryl, etc. advantageously having no more than 12 carbon atoms; and R' is a divalent aliphatic hydrocarbon radical of 1–6 carbon atoms.

While derivatives of the respective aromatic radicals are included within the scope of the invention, it is preferred that the various tetravalent aromatic radicals be unsubstituted except for the indicated oxy and carboxy radicals of the formula.

The polymers of this invention can be prepared by condensing tetrafunctional compounds of the formula

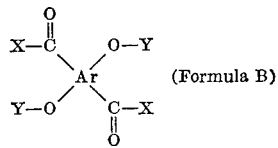

(Formula B)

wherein Ar is as defined above, X represents hydroxy, chlorine, bromine, iodine or OR, and Y represents hydrogen or an acyloxy radical of the formula

These tetrafunctional starting compounds can be prepared by various means but one of the simplest methods of preparation is by the Kolbe-Schmidt reaction wherein a compound having the desired internal or aromatic nuclear structure and two hydroxy groups, or groups convertible to hydroxy groups, in the desired position is converted to the corresponding dipotassium salt and then reacted with $CO_2$ under high pressures, such as 5000 p.s.i. The resultant carboxyl groups are attached ortho to the hydroxy groups.

In the condensation polymerization reaction by which the polymers of this invention are prepared, the condensation takes place initially between one carboxy or carboxyl halide group of one molecule with an hydroxy or derivative group thereof in another molecule, and hydroxy or carboxy groups in the resultant product react with additional monomers to form a linear polymer which eventually is further reacted through the remaining functional groups to form a ladder type structure. When X is halogen, the reactions proceed very quickly and the ladder type structure results very shortly after the linear chain is formed. If it is desired to produce a longer linear chain before ladder formation or to delay the ladder formation this can be effected by using compounds having the less reactive OR as the X group.

Typical of the monovalent hydrocarbon groups represented by R in the above formulas are: methyl, ethyl, propyl, butyl, amyl, hexyl, octyl, decyl, dodecyl, cyclohexyl, cycloheptyl, methylcyclohexyl, ethylcycloheptyl, phenyl, tolyl, naphthyl, ethylphenyl, methylnaphthyl, di-methylnaphthyl, allylphenyl, allyl, butenyl, octenyl, benzyl, phenethyl, phenylpropyl, etc.

Typical divalent aliphatic hydrocarbon radicals represented by R' are: methylene, ethylene, propylene, butylene, amylene, hexylene, vinylidene, ethylidene, propylidene, ethynylidene, etc.

Typical tetrafunctional starting monomers that can be used in preparing the polymers of this invention include, but are not restricted to:

1,4-dihydroxybenzene-2,5-dicarboxylic acid,
1,4-dihydroxybenzene-2,5-dicarboxylic acid chloride,
1,4-benzene-2,5-dicarboxylic acid bromide,
1,4-dihydroxybenzene-2,5-dicarboxylic acid iodide,
1,4-diacetoxybenzene-2,5-dicarboxylic acid,
1,4-diacetoxybenzene-2,5-dicarboxylic acid chloride,
1,4-diacetoxybenzene-2,5-dicarboxylic acid bromide,
1,4-dipropionoxybenzene-2,5-dicarboxylic acid chloride,
1,4-benzoxybenzene-2,5-dicarboxylic acid bromide,
1,4-phenylacetoxybenzene-2,5-dicarboxylic acid chloride,
1,4-ditoluoxybenzene-2,5-dicarboxylic acid,
1,4-didecanoxybenzene-2,5-dicarboxylic acid chloride,
the dimethyl ester of 1,4-dihydroxybenzene-2,5-dicarboxylic acid,
the diphenyl ester of 1,4-dihydroxybenzene-2,5-dicarboxylic acid,
the dibenzyl ester of 1,4-dihydroxybenzene-2,5-dicarboxylic acid,
the dicyclohexyl ester of 1,4-dihydroxybenzene-2,5-dicarboxylic acid,
the dihexyl ester of 1,4-diacetoxybenzene-2,5-dicarboxylic acid,
1,3-dihydroxybenzene-4,6-dicarboxylic acid chloride,
1,3-dihydroxybenzene-4,6-dicarboxylic acid,
1,3-dihydroxybenzene-4,6-dicarboxylic acid bromide,
1,4-dihydroxy-3,6-dibromobenzene-2,5-dicarboxylic acid chloride,
1,4-dihydroxy-3-bromobenzene-2,5-dicarboxylic acid bromide,
1,4-dihydroxy-3,6-dichlorobenzene-2,5-dicarboxylic acid chloride,
1,4-dihydroxy-3,6-dimethylbenzene-2,5-dicarboxylic acid,
1,4-dihydroxy-3-ethylbenzene-2,5-dicarboxylic acid chloride,
1,3-dihydroxy-5-chloro-2,4-dicarboxylic acid chloride,
1,3-dihydroxy-5-phenyl-2,4-dicarboxylic acid chloride,
1,3-dihydroxy-5-decyl-2,4-dicarboxylic acid bromide,
1,3-dihydroxy-5-cyclohexyl-2,4-dicarboxylic acid, etc.;
1,5-dihydroxynaphthalene-2,6-dicarboxylic acid,
1,5-dihydroxynaphthalene-2,6-dicarboxylic acid chloride,
1,5-dihydroxynaphthalene-2,6-dicarboxylic acid bromide,
1,5-dihydroxynaphthalene-2,6-dicarboxylic acid iodide,
the dimethyl ester of 1,5-dihydroxynaphthalene-2,6-dicarboxylic acid,
1,5-diacetoxynaphthalene-2,6-dicarboxylic acid chloride,
2,6-dihydroxynaphthalene-3,7-dicarboxylic acid,
2,6-dihydroxynaphthalene-3,7-dicarboxylic acid chloride,
2,6-diacetoxynaphthalene-3,7-dicarboxylic acid chloride,
1,5-dihydroxynaphthalene-4,8-dicarboxylic acid,
1,5-dihydroxynaphthalene-4,8-dicarboxylic acid chloride,
1,5-dibenzoxynaphthalene-4,8-dicarboxylic acid chloride,
1,5-dihydroxy-4-methylnaphthalene-2,6-dicarboxylic acid,
1,5-dihydroxy-4-butylnaphthalene-2,6-dicarboxylic acid chloride,
1,5-dihydroxy-4-cyclohexylnaphthalene-2,6-dicarboxylic acid bromide,
1,5-dihydroxy-4-benzylnaphthalene-2,6-dicarboxylic acid,
1,5-dihydrozy-4,8-dichloronaphthalene-2,6-dicarboxylic acid chloride,
1,5-dihydroxy-4,8-diiodonaphthalene-2,6-dicarboxylic acid,
1,6-dihydroxyanthracene-2,7-dicarboxylic acid,
1,6-dihydroxy-2,7-dimethylanthracene-5,10-dicarboxylic acid chloride, 1,9-dihydroxy-4,6-dichloroanthracene-2,8-dicarboxylic acid chloride,
1,4-dimethyl-5,10-dihydroxyanthracene-6,9-dicarboxylic acid bromide,
4,4'-dihydroxydiphenyl-3,3'-dicarboxylic acid,
4,4'-dihydroxydiphenyl-3,3'-dicarboxylic acid chloride,
4,4'-dihydroxydiphenyl-3,3'-dicarboxylic acid bromide,
4,4'-dihydroxydiphenyl-3,3'-dicarboxylic acid iodide,
4,4'-diacetoxydiphenyl-3,3'-dicarboxylic acid,
4,4'-diacetoxydiphenyl-3,3'-dicarboxylic acid chloride,
4,4'-diacetoxydiphenyl-3,3'-dicarboxylic acid bromide,
3,3'-dihydroxydiphenyl-4,4'-dicarboxylic acid,
3,3'-dihydroxydiphenyl-4,4'-dicarboxylic acid chloride,
4,4'-dihydroxydiphenylether-3,3'-dicarboxylic acid,
4,4'-dihydroxydiphenylether-3,3'-dicarboxylic acid chloride,
4,4'-dihydroxydiphenylether-3,3'-dicarboxylic acid bromide,
4,4'-dihydroxydiphenylether-3,3'-dicarboxylic acid iodide,
4,4'-diacetoxydiphenylether-3,3'-dicarboxylic acid,
4,4'-diacetoxydiphenylether-3,3'-dicarboxylic acid chloride,
4,4'-diacetoxydiphenylether-3,3'-dicarboxylic acid bromide,
3,3'-dihydroxydiphenylether-4,4'-dicarboxylic acid,
3,3'-dihydroxydiphenylether-4,4'-dicarboxylic acid chloride,
4,4'-dihydroxydiphenylsulfide-3,3'-dicarboxylic acid,
4,4'-dihydroxydiphenylsulfide-3,3'-dicarboxylic acid chloride,
4,4'-dihydroxydiphenylsulfide-3,3'-dicarboxylic acid bromide,
4,4'-dihydroxydiphenylsulfide-3,3'-dicarboxylic acid iodide,
4,4'-diacetoxydiphenylsulfide-3,3'-dicarboxylic acid,
4,4'-diacetoxydiphenylsulfide-3,3'-dicarboxylic acid chloride,
4,4'-diacetoxydiphenylsulfide-3,3'-dicarboxylic acid bromide,
3,3'-dihydroxydiphenylsulfide-4,4'-dicarboxylic acid,
3,3'-dihydroxydiphenylsulfide-4,4'-dicarboxylic acid chloride,
4,4'-dihydroxydiphenylsulfoxide-3,3'-dicarboxylic acid,
4,4'-dihydroxydiphenylsulfoxide-3,3'-dicarboxylic acid chloride,
4,4'-dihydroxydiphenylsulfoxide-3,3'-dicarboxylic acid bromide,
4,4'-dihydroxydiphenylsulfoxide-3,3'-dicarboxylic acid iodide,
4,4'-diacetoxydiphenylsulfoxide-3,3'-dicarboxylic acid,
4,4'-diacetoxydiphenylsulfoxide-3,3'-dicarboxylic acid chloride,
4,4'-diacetoxydiphenylsulfoxide-3,3'-dicarboxylic acid bromide,
3,3'-dihydroxydiphenylsulfoxide-4,4'-dicarboxylic acid,
3,3'-dihydroxydiphenylsulfoxide-4,4'-dicarboxylic acid chloride,
4,4'-dihydroxydiphenylsulfone-3,3'-dicarboxylic acid,
4,4'-dihydroxydiphenylsulfone-3,3'-dicarboxylic acid chloride,
4,4'-dihydroxydiphenylsulfone-3,3'-dicarboxylic acid bromide,
4,4'-dihydroxydiphenylsulfone-3,3'-dicarboxylic acid iodide,
4,4'-diacetoxydiphenylsulfone-3,3'-dicarboxylic acid,
4,4'-diacetoxydiphenylsulfone-3,3'-dicarboxylic acid chloride,
4,4'-diacetoxydiphenylsulfone-3,3'-dicarboxylic acid bromide,
3,3'-dihydroxydiphenylsulfone-4,4'-dicarboxylic acid,
3,3'-dihydroxydiphenylsulfone-4,4'-dicarboxylic acid chloride,
4,4'-dihydroxydiphenylmethane-3,3'-dicarboxylic acid,
4,4'-dihydroxydiphenylmethane-3,3'-dicarboxylic acid chloride,
4,4'-dihydroxydiphenylmethane-3,3'-dicarboxylic acid bromide,
4,4'-dihydroxydiphenylmethane-3,3'-dicarboxylic acid iodide,
4,4'-diacetoxydiphenylmethane-3,3'-dicarboxylic acid,
4,4'-diacetoxydiphenylmethane-3,3'-dicarboxylic acid chloride,
4,4'-diacetoxydiphenylmethane-3,3'-dicarboxylic acid bromide,
3,3'-dihydroxydiphenylmethane-4,4'-dicarboxylic acid,
3,3'-dihydroxydiphenylmethane-4,4'-dicarboxylic acid chloride,
4,4'-dihydroxydiphenylpropane-3,3'-dicarboxylic acid,
4,4'-dihydroxydiphenylpropane-3,3'-dicarboxylic acid chloride,
4,4'-dihydroxydiphenylpropane-3,3'-dicarboxylic acid bromide,
4,4'-dihydroxydiphenylbutane-3,3'-dicarboxylic acid iodide,
4,4'-diacetoxydiphenylhexane-3,3'-dicarboxylic acid,
4,4'-diacetoxydiphenylhexane-3,3'-dicarboxylic acid chloride,
4,4'-diacetoxydiphenylethylene-3,3'-dicarboxylic acid bromide,
3,3'-dihydroxydiphenylethylene-4,4'-dicarboxylic acid,
3,3'-dihydroxydiphenylpropylene-4,4'-dicarboxylic acid chloride,
4,4'-dihydroxydiphenylamine-3,3'-dicarboxylic acid,
4,4'-dihydroxydiphenylamine-3,3'-dicarboxylic acid chloride,
4,4'-dihydroxydiphenylamine-3,3'-dicarboxylic acid bromide,
4,4'-dihydroxydiphenylbutylamine-3,3-dicarboxylic acid iodide,
4,4'-diacetoxydiphenylamine-3,3'-dicarboxylic acid,
4,4'-diacetoxydiphenyl-benzylamine-3,3'-dicarboxylic acid chloride,
4,4'-diacetoxydiphenyl-phenylamine-3,3'-dicarboxylic acid bromide,
3,3'-dihydroxydiphenylamine-4,4'-dicarboxylic acid,
3,3'-dihydroxydiphenylamine-4,4'-dicarboxylic acid chloride,
4,4'-dihydroxy-diphenoxydimethylsilane-3,3'-dicarboxylic acid,
4,4'-dihydroxy-diphenoxydiethylsilane-3,3'-dicarboxylic acid chloride,
4,4'-dihydroxy-diphenoxydimethylsilane-3,3'-dicarboxylic acid bromide,
4,4'-dihydroxy-diphenoxydipropylsilane-3,3'-dicarboxylic acid iodide,
4,4'-diacetoxy-diphenyldimethylsilane-3,3'-dicarboxylic acid,
4,4'-diacetoxy-diphenyldibutylsilane-3,3'-dicarboxylic acid chloride,
4,4'-diacetoxy-diphenyldibenzylsilane-3,3'-dicarboxylic acid bromide,
3,3'-dihydroxy-diphenyldipropylsilane-4,4'-dicarboxylic acid,
3,3'-dihydroxy-diphenyldiamylsilane-4,4'-dicarboxylic acid chloride,
4,4'-dihydroxy-diphenyldimethoxysilane-3,3'-dicarboxylic acid,
4,4'-dihydroxy-diphenyldimethoxysilane-3,3'-dicarboxylic acid chloride,
4,4'-dihydroxy-diphenyldiethoxysilane-3,3'-dicarboxylic acid bromide,
4,4'-dihydroxy-diphenyldibutoxysilane-3,3'-dicarboxylic acid iodide,
4,4'-diacetoxy-diphenyldiphenoxysilane-3,3'-dicarboxylic acid,
4,4'-diacetoxy-diphenyldicyclohexoxysilane-3,3'-dicarboxylic acid chloride,
4,4'-diacetoxy-diphenyldibenzyloxysilane-3,3'-dicarboxylic acid bromide, 3,3'-dihydroxy-diphenylethoxysilane-4,4'-dicarboxylic acid,
3,3'-dihydroxy-diphenyl-ditolyloxysilane-4,4'-dicarboxylic acid chloride,
4,4'-dihydroxy-diphenyl-methyl-phosphinate-3,3'-dicarboxylic acid,
4,4'-dihydroxy-diphenyl-ethyl-phosphinate-3,3'-dicarboxylic acid chloride,
4,4'-dihydroxy-diphenyl-butyl-phosphinate-3,3'-dicarboxylic acid bromide,
4,4'-dihydroxy-diphenyl-hexyl-phosphinate-3,3'-dicarboxylic acid iodide,
4,4'-diacetoxy-diphenyl-phenyl-phosphinate-3,3'-dicarboxylic acid,
4,4'-diacetoxy-diphenyl-benzyl-phosphinate-3,3'-dicarboxylic acid chloride,
4,4'-diacetoxy-diphenyl-phenethyl-phosphinate-3,3'-dicarboxylic acid bromide,
3,3'-dihydroxy-diphenyl-naphthyl-phosphinate-3,3'-dicarboxylic acid,
3,3'-dihydroxy-diphenyl-tolyl-phosphinate-3,3'-dicarboxylic acid chloride,
4,4'-dihydroxy-diphenyl-cyclohexyl-phosphinate-3,3'-dicarboxylic acid,
4,4'-dihydroxy-diphenyl-allyl-phosphinate-3,3'-dicarboxylic acid chloride,
4,4'-dihydroxy-diphenyl-methylphosphineoxide-3,3'-dicarboxylic acid,
4,4'-dihydroxy-diphenyl-ethylphosphineoxide-3,3'-dicarboxylic acid chloride,
4,4'-dihydroxy-diphenyl-butylphosphineoxide-3,3'-dicarboxylic acid bromide,
4,4'-dihydroxy-diphenyl-hexylphosphineoxide-3,3'-dicarboxylic acid iodide,
4,4'-dihydroxy-diphenyl-cyclohexylphosphineoxide-3,3'-dicarboxylic acid iodide,
4,4'-dihydroxy-diphenyl-allylphosphineoxide-3,3'-dicarboxylic acid iodide,
4,4'-diacetoxy-diphenyl-phenylphosphineoxide-3,3'-dicarboxylic acid,
4,4'-diacetoxy-diphenyl-benzylphosphineoxide-3,3'-dicarboxylic acid chloride,
4,4'-diacetoxy-diphenyl-phenethylphosphineoxide-3,3'-dicarboxylic acid bromide,
3,3'-dihydroxy-diphenyl-naphthylphosphineoxide-4,4'-dicarboxylic acid,
3,3'-dihydroxy-diphenyl-tolylphosphineoxide-4,4'-dicarboxylic acid chloride.

The linear or initial polymers of this invention have a repeating unit of the structure

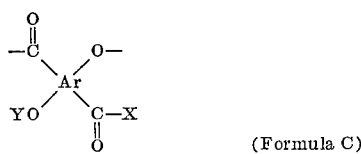

(Formula C)

When the two remaining functional groups of the above repeating unit structure are reacted with groups in adjacent repeating units, eight-membered rings are formed embracing two carbon atoms of two adjacent aromatic rings and two carboxylate radicals. This results in the formation of the repeating unit indicated above by Formula A.

In certain of the compounds used in preparing the polymers of this invention there is a rigid structure which prevents rotation of one part of the molecule with respect to another part. Typical of these are the tetrafunctional compounds in which the functional groups are attached directly to a benzene, naphthalene or anthracene nucleus, and also those compounds having the formula above in which there are two Z' groups. In each of these compounds there is a rigid structure so that when the four functional groups are reacted to form two of the above-mentioned eight-membered rings, there is no rotation possible on a linear axis. Such structure is referred to as a "ladder." However, starting compounds based on a nucleus having a single bond connecting one portion of the nucleus to another portion, such as diphenyl, diphenylether, diphenylsulfide, etc., are not capable of forming a complete "ladder" type structure in the polymer molecule.

The polymerizations of this invention are conducted either by melt polymerization or by polymerization in solution, suitable solvents being: diphenylether, nitrobenzene, 1,2,4-trichlorobenzene, dichloronaphthalene, sulfolane, benzophenone, triethyleneglycol dimethylether, etc. A wide variety of solvents can be used, the only requirements being that they are non-reactive with the various reagents being used, and that they have sufficient solvent power for the reagents and for the polymer products so that the polymers are not precipitated from the reaction medium before they have attained a desired molecular weight. The structure of the various polymer products is identified by infrared spectrum.

The conditions for the reaction will vary somewhat according to the particular reagents, the solvent, the rate of removal of the condensation vapor or gas, e.g. water or HCl, pressure, etc. Advantageously a temperature of at least 100° C. is used and either reduced pressure or a stream of inert gas is used to facilitate removal of the by-product gas.

The progress of the reaction can be determined by various means, one of the most convenient being the collection and measurement of the amount of hydrogen chloride given off when an acid chloride is used as a starting material. When the amount of hydrogen chloride evolution is determined as approaching the stoichiometric amount, this indicates that the polymer structure is approaching or has reached complete cyclization either through adjacent repeating units represented above as giving the eight-membered rings, or through a number of repeating units which give larger ring structures also as indicated below in Formula E.

DESCRIPTION OF THE PREFERRED EMBODIMENTS

The various reactions and processes by which the polymers of this invention are prepared are illustrated immediately hereinafter by specific reference to the use of 4,4' - dihydroxydiphenylether - 3,3' - dicarboxylic acid chloride. However, the other tetrafunctional starting materials referred to herein as appropriate for this purpose can be substituted in place of the above-mentioned compound. Since the structures of the compounds and the polymeric structures of the products are relatively complex, it is preferred to use this one starting material as illustrative for the various others.

In the initial condensation reaction of this compound, a linear polymer structure is obtained having the formula shown below by Formula C'.

As the condensation proceeds, the linear chain increases in length and some of the second acid chloride groups in the repeating units react with hydroxy groups in adjacent repeating units so that the polymer has a combination of linear and cyclic connections between repeating units as illustrated by the structure shown below in Formula D.

As ring closure is effected by the condensation either through two adjacent repeating units as illustrated in Formula D or in the formation of larger rings with branching or crosslinking of the polymer chains as illustrated below in Formula E, the polymers become more insoluble and precipitate from the solvent in which the polymerization is being effected.

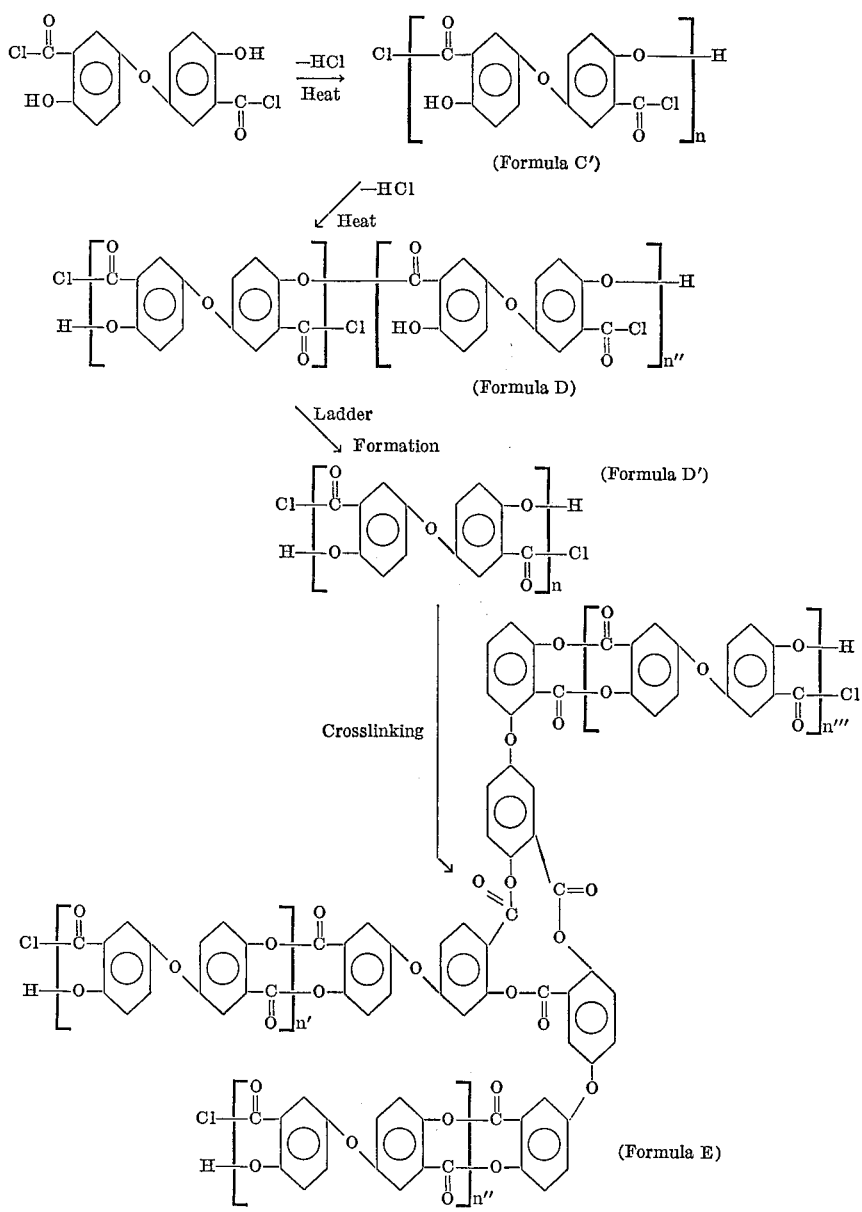

While the respective linear and cyclic connecting structures are grouped in their respective brackets in Formulas D and E it is not intended to imply that the polymer is of a block type. Instead, the respective repeating units are distributed at random throughout the length of the polymer. Moreover, if there is any moisture present, it may react with some of the acid chloride radicals to generate carboxylic acid groups which are much less reactive and in such instances may not complete cyclization, with the result that the ultimate polymer may have some non-cyclic or linear-type repeating units in which there are free carboxylic acid and hydroxy groups present.

It is also possible for some of the acid chloride groups in the linear structure shown in Formula C to react with hydroxy groups in a monomer molecule not adjacent in the linear structure, or with a repeating unit in another linear chain and thereby start a crosslinking or cyclic structure as shown in Formula E.

It is obvious therefore that the polymers can have some of each of the three types of structure, namely the linear type, the ladder type and the larger ring structure having three or more of the monomeric units joined in a cyclic structure. As the condensation proceeds, there is gradually less of the linear type of structure present and more of the cyclic structures. In most cases it is believed that the polymer structure is predominantly of the type of repeating units in which adjacent repeating units are joined to form the eight-membered rings such as illustrated in Formula D'. In some cases, however, as pointed out above, if there is any moisture present or the starting materials are not as reactive as the acid chloride groups used in the foregoing illustration, there may be a higher precentage of the linear type of repeating unit. In such cases the polymer products are more soluble and can go to a higher molecular weight before being precipitated from the reaction medium.

The invention is best illustrated by the following examples. These examples are given for purposes of illustration and are not intended in any way to restrict the scope of the invention nor the manner in which it may be practiced. Unless specified otherwise, parts and percentages are given by weight. In these experiments the polymerizations are carried out in a reactor equipped with an agitator and either a means for passing an inert gas, such as nitrogen, through the reaction mass, or an evacuation means to reduce the pressure and remove the by-product gas. Means for determining the temperature and pressure and for removing samples are also provided. Unless specified otherwise, temperatures are given in degrees centigrade. Some of the examples refer to the use of "sulfolane" as a solvent. This is also known as tetramethylene sulfone.

EXAMPLE I

Preparation of 4,4'-dihydroxydiphenylether-3,3'-dicarboxylic acid

Twenty grams of 4,4'-dihydroxydiphenylether (0.112 mole) is dissolved in a solution of 15 g. of potassium hydroxide in 20 ml. of water. The solution is evaporated to dryness under reduced pressure and the salt is transferred to an autoclave cylinder. The cylinder is dried in a vacuum oven at 110°/0.1 mm. for 24 hours, then connected while hot to a source of dry carbon dioxide under pressure, and heated up to 185°. The pressure reaches a maximum of 5000 p.s.i. at this temperature. After 24 hours, the apparatus is cooled and the carbon dioxide is bled off. The contents of the cylinder are stirred into 100 ml. of water and the resultant cloudy solution is treated with a little potassium hydroxide to give a clear solution. Then the product is precipitated by the addition of hydrochloric acid. After filtering, washing and air drying, the crude filtered product weighs 26.6 g. This crude acid product is added to a solution of 60 g. of sodium bicarbonate in 800 ml. of water. The undissolved, unreacted 4,4'-dihydroxydiphenylether is filtered off. The filtrate is heated with charcoal and refiltered. The purified acid is recovered from this filtrate by the addition of dilute hydrochloric acid. It is washed with water and vacuum dried at 100°/0.02 mm. to give a yield of 25.9 g. (M.P. 256°–258°). This compound is recrystallized as follows: 0.5 g. of the compound is dissolved in 250 ml. of hot water. The solution is cooled to room temperature and left overnight in an ice box. The white solid precipitate is filtered off, and dried at 100°/0.02 mm. for 6 hours (M.P. 260°–262°).

*Analysis.*—Calculated for $C_{14}H_{10}O_7$ (percent): C, 57.94; H, 3.47; O, 38.59. Found (percent): C, 57.32; H, 3.52; O, 39.16.

The above procedure is repeated satisfactorily a number of times using in place of the dihydroxydiphenylether used there equivalent amounts respectively of appropriate starting compounds having two hydroxy groups to give the following compounds:

1,4-dihydroxybenzene-2,5-dicarboxylic acid,
1,3-dihydroxybenzene-4,6-dicarboxylic acid,
1,4-dihydroxy-3,6-dibromobenzene-2,5-dicarboxylic acid,
1,5-dihydroxynaphthalene-2,6-dicarboxylic acid,
1,5-dihydroxy-4,8-dimethyl-naphthalene-3,6-dicarboxylic acid,
1,6-dihydroxyanthracene-2,7-dicarboxylic acid,
4,4'-dihydroxydiphenyl-3,3'-dicarboxylic acid,
3,3'-dihydroxydiphenyl-4,4'-dicarboxylic acid,
4,4'-dihydroxydiphenylsulfide-3,3'-dicarboxylic acid,
4,4'-dihydroxydiphenylsulfoxide-3,3'-dicarboxylic acid,
4,4'-dihydroxydiphenylsulfone-3,3'-dicarboxylic acid,
4,4'-dihydroxydiphenylmethane-3,3'-dicarboxylic acid,
4,4'-dihydroxydiphenyl-1,2-ethylene-3,3'-dicarboxylic acid,
4,4'-dihydroxydiphenylamine-3,3'-dicarboxylic acid,
4,4'-dihydroxydiphenoxydimethylsilane-3,3'-dicarboxylic acid,
4,4'-dihydroxydiphenoxydiethoxysilane-3,3'-dicarboxylic acid,
3,3'-dihydroxy-diphenylethoxysilane-4,4'-dicarboxylic acid,
4,4'-dihydroxy-diphenyl-methylphosphineoxide-3,3'-dicarboxylic acid,
4,4'-dihydroxy-diphenyl-butylphosphinate-3,3'-dicarboxylic acid,
4,4'-dihydroxy-diphenyl-methylphosphinate-3,3'-dicarboxylic acid.

EXAMPLE II

Preparation of 4,4'-dihydroxydiphenylether-3,3'-dicarboxylic acid chloride

One gram of 4,4'-dihydroxydiphenylether-3,3'-dicarboxylic acid, 0.0034 mole, is refluxed with 35 ml. of thionyl chloride and 100 ml. of ether for 24 hours. The reaction mixture is then evaporated to dryness in a hood air stream and the dried residue is extracted with 400 ml. of boiling hexane. The hexane extract is reduced in volume to 100 ml. by boiling and then cooled in Dry Ice. The yellow crystal product is filtered off and dried at room temperature at a reduced pressure of 0.02 mm. for 3 hours to give a yield of 0.2 g. (M.P. 134°–135° C.). Recrystallization again from hexane gives yellow crystals having a melting point of 135°–137° C. The analysis shows:

Calcd. for $C_{14}H_8O_5Cl_2$ (percent): C, 51.45; H, 2.46; O, 24.40; Cl, 21.70. Found (percent): C, 51.76; H, 2.66; O, 24.20; Cl, 21.38.

The above procedure is repeated satisfactorily a number of times using in place of the above dicarboxylic acid equivalent amounts respectively of the other dicarboxylic acids produced in Example I. In each case the corresponding acid chloride is obtained.

EXAMPLE III

Preparation of 4,4'-diacetoxydiphenylether-3,3'-dicarboxylic acid

Eight grams of 4,4'-dihydroxydiphenylether-3,3'-dicarboxylic acid is boiled with 60 ml. of acetic anhydride and 150 ml. of glacial acetic acid in a 250 ml. flask for 3½ hours. The solution is treated with charcoal and filtered while hot. The volume is reduced to about 50 ml. by boiling and the product precipitated by cooling. It is filtered off, washed with hexane and dried at 60°/0.02 mm. for 18 hours to give a yield of 5.5 g. Another crop of 0.7 g. is obtained by concentration of the mother liquor. The total yield is 6.2 g. The product melts to a clear liquid at 223°–236° accompanied by decomposition. If the temperature is raised slowly at a rate below one degree per minute the solid sinters but does not melt. Apparently, the decomposition at the melting point involves polymerization. Analysis shows the following results:

Calcd. for $C_{18}H_{14}O_9$ (percent): C, 57.45; H, 3.77; O, 38.40. Found (percent): C, 57.24; H, 3.73; O, 38.17.

The various other dicarboxylic acids produced in Example I are individually substituted in equivalent amount for the dicarboxylic acid used above and in each case the corresponding diacetoxy derivative is obtained.

The above procedure is repeated a number of times to give the corresponding acyl derivatives by substituting respectively in place of the acetic anhydride an equivalent amount in each case of the following individual acyl chlorides, and in place of the acetic acid solvent the same amount of phenylmethyl ether (anisole): propionyl chloride, dodecionyl chloride, benzoyl chloride, naphthoyl chloride, toluoyl chloride, phenylacetyl chloride, and cyclohexylformyl chloride. In each case the corresponding diacyl diacid is obtained.

EXAMPLE IV

Preparation of 4,4'-diacetoxydiphenylether-3,3'-dicarboxylic acid chloride

The procedure of Example II is repeated a number of times using respectively in place of the 4,4'-dihydroxydiphenylether-3,3'-dicarboxylic acid and other dicarboxylic acids of that example equivalent amounts respectively of the various diacyl derivatives produced according to Example III. In each case the corresponding diacyl diacid chloride is produced.

EXAMPLE V

Polymerization of 4,4'-diacetoxydiphenylether-3,3'-dicarboxylic acid in sulfolane 4,4'-diacetoxydiphenylether - 3,3' - dicarboxylic acid is dissolved in anhydrous sulfolane to give a clear solution of about 2% concentration. The solution is heated at 200° in a stream of nitrogen, the solution remaining clear for the first few hours, but after 17 hours the polymeric reaction product is completely precipitated. Analysis shows that the polymer formation has proceeded beyond the linear stage and that the extent of reaction is sufficient for gel and/or ladder structures to have been formed as shown in Formula E.

EXAMPLE VI 4,4' - dihydroxydiphenylether - 3,3' - dicarboxylic acid chloride is synthesized in accordance with Example II. Polymerizations are carried out in dilute solution in the various solvents indicated in Table I. The evolved hydrogen chloride is removed in a dry nitrogen stream, absorbed in water and measured by titration with N/10 sodium hydroxide. The results are summarized in Table I.

TABLE I.—SOLUTION POLYMERIZATION OF 4,4'-DIHYDROXYDIPHENYL ETHER-3,3' DICARBOXYLIC ACID CHLORIDE IN VARIOUS SOLVENTS

| Solvent | Conc. of solution, percent | Temp., °C. | Reaction time, hrs. | Percent conversion | |
|---|---|---|---|---|---|
| Diphenylether | 3.0 | 100 | 54 | 88 | Clear solution. |
|  | 3.0 | 100 | 66 | 91 | Precipitation begins. |
|  | 3.0 | 150 | 164 | 99.2 | Insoluble polymer. |
| Nitrobenzene | 0.25 | 100 | 70 | 94.2 | Clear solution. |
|  | 0.25 | 150 | 144 | 96 | Colloidal. |
| 1,2,4-tri-chlorobenzene | 2.0 | 130 | 55 | 69.6 | Clear solution. |
|  | 2.0 | 150 | 93 | 78 | Insoluble polymer. |
| Dichloro-naphthalene | 0.40 | 100 | 90 | 59.5 | |
|  | 0.40 | 175 | 152 | 70.5 | Precipitation begins. |
|  | 0.40 | 175 | 160 | 72.5 | Polymer precipitated. |
|  | 0.40 | 250 | 165 | 74.5 | Do. |
| Sulfolane | 0.50 | 130–150 | 195 | 96.8 | Clear solution. |
|  | 0.50 | 130–150 | 260 | 99.4 | Polymer precipitated. |

The titrations show that substantially more than 50% of the theoretical amount of hydrogen chloride (calculated on the basis of a ladder or crosslinked structure) is evolved before the polymers begin to precipitate from solution. Precipitation occurs earlier when 1,2,4-trichlorobenzene or dichloronaphthalene is used as the solvent, and with these solvents insoluble polymers are obtained at 70% to 78% conversion. Conversion in diphenylether is carried out to about 91% before precipitation begins. Best results are obtained when nitrobenzene, benzophenone, triethyleneglycol dimethylether, or sulfolane is used as solvent. When the reaction is run in nitrobenzene a 25 ml. aliquot of the clear solution is withdrawn from the reaction mixture at a conversion of 94%. An inherent viscosity determination run on this sample gives a value of 0.14. At 96% conversion, the solution is slightly turbid, but no appreciable amount of polymer has precipitated. When the reaction is run in sulfolane, the solution is still clear at 99.4% conversion, and the polymer is precipitated by pouring the solution into toluene. The dried polymer has an inherent viscosity of 0.08 in meta cresol.

The infrared spectrum of the polymer precipitated by the addition of toluene to the sulfolane solution shows only a little absorption in the 3000 cm.$^{-1}$ to 3500 cm.$^{-1}$ region where bonded OH and COOH frequencies are expected. Hydrolysis is apparently minimal, since the strong —C=O band appearing at 1667 cm.$^{-1}$ in the spectra of both 4,4'-dihydroxydiphenylether-3,3' - dicarboxylic acid and its acyl chloride band is missing, and the new band due to the ester —C=O group at 1754 cm.$^{-1}$ is quite strong. This indicates that substantial ester formation has taken place. In the case of the polymer produced in dichloronaphthalene, its infrared spectrum shows that substantial ester formation has taken place because of the strength of the new band at 1754 cm.$^{-1}$ and the absence of the band at 1667 cm.$^{-1}$. An examination of the infrared spectra of the polymers produced in diphenylether, 1,2,4-trichlorobenzene and nitrobenzene reveals that the —C=O band at 1667 cm.$^{-1}$ is still present. This indicates some incomplete reaction possibly due to hydrolysis, since some absorption is noted in the 3000 cm.$^{-1}$ to 3500 cm.$^{-1}$ region. Titration values indicate that conversion is quite high before precipitation occurs and therefore it can be inferred that hydrolysis has resulted from the presence of moisture in the solvent or by introduction of moisture in the nitrogen gas stream.

It appears that "ladder disalicylide" linkages are formed in dilute solutions of certain solvents, notably in dichloronaphthalene and in sulfolane and that low molecular weight "ladder prepolymers" can be produced. Since such polymers are of interest for the preparation of films and laminates, their formation in solution is better assured by rigorous exclusion of moisture.

The fact that some of the polymers precipitate at earlier stages of "ladder formation" than others is a function of the solubility of those polymers in the particular solvent used. From the titration results it is obvious that a certain number of ladder disalicylide linkages are formed up to the point where precipitation begins. Crosslinkages may then be started as shown in Formula E, thus converting the soluble polymer into a three dimensional insoluble structure.

EXAMPLE VII

Melt polymerization of 4,4'-dihydroxydiphenylether-3,3'-dicarboxylic acid chloride Melt polymerization of this monomer is conducted for 216 hours in a nitrogen stream at 175° C.–200° C. The evolved hydrogen chloride is absorbed in water and titrated with N/10 sodium hydroxide. The titration curve indicates a conversion of 93.1%. The polymer is insoluble in organic solvents and is apparently crosslinked. Analysis indicates that reaction is incomplete for a ladder or crosslinked structure, and low chlorine values indicate that most of the unreacted acylchloride groups are hydrolized. This is confirmed by the presence of broad absorption in the 2900 cm.$^{-1}$ region of its infrared spectrum where bonded OH and COOH bands are expected. The appearance of the new —C=O band at 1724 cm.$^{-1}$ shows that esterification has taken place, but the persistence of the —C=O band at 1667 cm.$^{-1}$ indicates that the reaction is by no means complete.

EXAMPLE VIII

Melt polymerization of 4,4'-diacetoxydiphenylether-3,3'-dicarboxylic acid

The solid monomer is added under nitrogen to a tube preheated to 310°–320° to insure instant melting. After ten minutes, the temperature of the tube is reduced to 240°–250° and the sample is heated in this range for 22 hours. Its infrared spectrum shows that the esterification reaction has proceeded closer to completion than the melt reaction of the acyl chloride described above. This is evidenced by the greatly diminished intensity of the —C=O band at 1667 cm.$^{-1}$ to a weak shoulder, as well as the much weaker absorption in the 3000 cm.$^{-1}$ to 3500 cm.$^{-1}$ range. The softening point curve shows a slight dip at 190° where melting of the monomer occurs, indicating that a small amount of the unreacted monomer is probably present in the sample. The main sharp break in the curve at about 280° C. is due to the softening of the polymer.

EXAMPLE IX

Preparation of laminates with 4,4'-diacetoxydiphenylether-3,3'-dicarboxylic acid Small one-ply laminates, 1″ by 1″, are easily prepared by packing both sides of a piece of glass cloth with 0.2 grams of the powdered monomer, 4 drops of dimethylacetamide and pressing the product between two preheated aluminum plates at 215°–218° under a pressure of 9½ p.s.i. Laminates prepared in this way have good resin flow and are tough and flexible.

TABLE 2.—PREPARATION OF ONE-PLY LAMINATES FROM 4,4-DIACETOXYDIPHENYLETHER-3,3'DICARBOXYLIC ACID

| Temp. (°C.) | | Time (min.) | Glass cloth (g.) | Laminate weight after curing (g.) | Resin content (g.) |
|---|---|---|---|---|---|
| Begin | End | | | | |
| 218 | 242 | 6 | 0.180 | 0.238 | 0.058 |
| 222 | 245 | 7 | 0.220 | 0.300 | 0.080 |
| 200 | 245 | 7 | 0.220 | 0.300 | 0.080 |
| 203 | 260 | 8 | 0.300 | 0.260 | 0.060 |

An eight-ply laminate 3″ by 3″ is also prepared. A paste of the monomer in dimethylacetamide (2:1) is used to impregnate the glass cloth. The "composite" is cured in a hydraulic press initially preheated to 180° C. and up to 250° C. over a 30 minute period up to a maximum of 10 p.s.i. The laminate has a low resin content, i.e., 16.2%, but is tough and flexible, having a flexural strength of 66,000 p.s.i. and a modulus of about 3,350,000 at room temperature.

EXAMPLE X (a) Polymerization of 4,4'-dihydroxydiphenyl-3,3'-dicarboxylic acid chloride in sulfolane 1.01 g. of 4,4'-dihydroxydiphenyl-3,3'-dicarboxylic acid chloride is dissolved in 200 ml. of anhydrous, freshly distilled sulfolane (B.P. 110°/0.2 mm.). The solution is stirred with a magnetic stirrer in a 250 ml. three-necked flask in a slow stream of nitrogen at 130°–150°. The evolved hydrogen chloride gas in the nitrogen stream is absorbed in water and titrated periodically with N/10 sodium hydroxide. After 260 hours the amount of hydrogen chloride titrated indicates a conversion of 99.4%. The solution is filtered through a fritted glass funnel. The clear filtrate is poured into 1500 ml. of toluene containing 50 ml. of hexane. This solution is cooled in ice and the finely divided precipitated polymer is filtered off. It is vacuum dried at 100°/0.04 mm. for 48 hours. The product is washed again with hot toluene, and vacuum dried again at 100°/0.04 mm. for 24 hours to give a yield of 0.79 gm. of polymer. Carbon and hydrogen analyses give results between those calculated for polymers corresponding to Formulas C' and D'.

Polymers are likewise produced when the above procedure is repeated using equivalent amounts respectively of the following individual monomers:

(b) 1,4-dihydroxybenzene-2,5-dicarboxylic acid chloride,
(c) 1,4-dihydroxy-3,6-dibromobenzene-2,5-dicarboxylic acid chloride,
(d) 1,5-dihydroxy-4,8-dimethyl-naphthalene-2,6-dicarboxylic acid chloride,
(e) 3,3'-dihydroxydiphenyl-4,4'-dicarboxylic acid bromide,
(f) 4,4'-dihydroxydiphenylsulfide-3,3'-dicarboxylic acid chloride,
(g) 4,4'-dihydroxydiphenylamine-3,3'-dicarboxylic acid bromide,
(h) 4,4'-dihydroxydiphenoxydimethylsilane-3,3'-dicarboxylic acid chloride,
(i) 4,4'-dihydroxydiphenoxydiethoxysilane-3,3'-dicarboxylic acid chloride, and
(j) 4,4'-dihydroxydiphenyldimethylsilane-3,3'-dicarboxylic acid chloride.

EXAMPLE XI (a) Polymerization of 1,4-dihydroxybenzene - 2,5-dicarboxylic acid chloride in nitrobenzene 0.437 g. of 1,4-dihydroxybenzene-2,5-dicarboxylic acid chloride is dissolved in 250 ml. of freshly distilled nitrobenzene. The reaction mixture is heated and stirred in a nitrogen stream for 72 hours at 100° C., 48 hours at 120° and 24 hours at 150° C. The evolved hydrogen chloride is absorbed in water and titrated periodically with N/10 NaOH. The total amount HCl evolved indicates a conversion of 95%. The polymer product is dried at 160° for 72 hours. The carbon and hydrogen analyses give results which are between those calculated for polymer structures corresponding to Formulas C' and D'.

Polymers are similarly produced when the above procedure is repeated using equivalent amounts respectively of the following individual monomers:

(b) 4,4'-dihydroxydiphenylsulfoxide-3,3'-dicarboxylic acid chloride;
(c) 4,4'-dihydroxydiphenylsulfone-3,3'-dicarboxylic acid bromide;
(d) 4,4'-dihydroxydiphenylmethane-3,3'-dicarboxylic acid chloride;
(e) 4,4'-dihydroxydiphenylpropane-3,3'-dicarboxylic acid iodide; and
(f) 4,4'-dihydroxydiphenyl-1,2-ethylene-3,3'-dicarboxylic acid chloride;
(g) 4,4'-dihydroxy-diphenylphosphonylchloride-3,3'-dicarboxylic acid chloride;
(h) 4,4'-diacetoxy-diphenyl-phosphonylbromide-3,3'-dicarboxylic acid bromide;
(i) 4,4'-dihydroxy-diphenyl-phosphonic acid-3,3'-dicarboxylic acid chloride; and
(j) 4,4'-dihydroxy-diphenyl-methylphosphonate-3,3'-dicarboxylic acid.

Illustrated below are repeating units present in various polymers produced according to some of the above working examples. In each case, the linear polymer repeating unit is given first and then the cyclic or eight-membered ring or ladder type.

Example IV:

Linear  and  Ladder

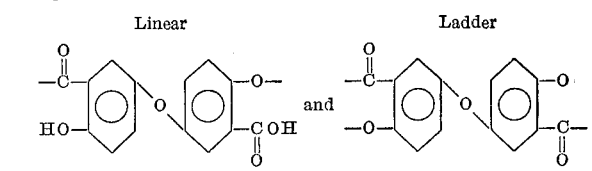

Example VI and VII:

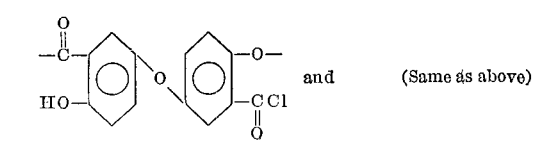

and  (Same as above)

Example VIII:

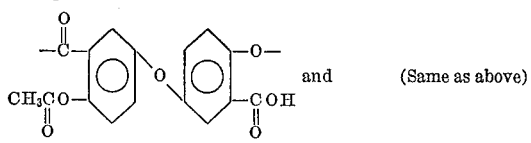 and (Same as above)

Example X:

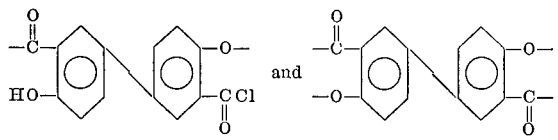 and

Example X(a):

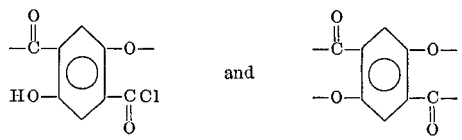 and

Example XI(d):

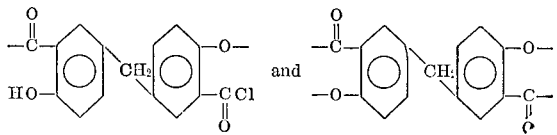 and

EXAMPLE XII

Preparation of 4,4'-dihydroxydiphenyl-3,3'-dicarboxylic acid 4,4'-dihydroxydiphenyl (25 g.) is dissolved in 110 ml. of water containing 23 g. of potassium hydroxide. The solution is concentrated by evaporation at 70° in a vacuum oven at 0.1 mm. The residual dry salt is transferred to an autoclave cylinder and heated at 130° at 0.08 mm. in the vacuum oven for 18 hours. The autoclave cylinder is then connected to a source of dry $CO_2$ and the apparatus maintained at 200° and at least initially at 3500 p.s.i. After 24 hours the pressure has dropped to 2800 p.s.i. The reaction mixture is stirred into 500 ml. of water and the crude acid is precipitated by addition of dilute hydrochloric acid. The acid is purified by dissolving in 1 liter of sodium bicarbonate solution and the small amount of unreacted starting material is filtered off. The filtrate is treated with charcoal and filtered and then treated with dilute hydrochloric acid. The product is filtered off, washed with 2 liters of cold water, and dried at 100°/0.05 mm. for 24 hours. Yield, 30 g.

*Analysis.*—Calculated for $C_{14}H_{10}O_6$ (percent): C, 61.32; H, 3.68. Found (percent): C, 61.43; H, 3.79.

EXAMPLE XIII

Preparation of 4,4'-diacetoxydiphenyl-3,3'-dicarboxylic acid 4,4'-dihydroxydiphenyl-3,3'-dicarboxylic acid (4.8 g.) is refluxed with a mixture of 50 ml. of acetic anhydride and 100 ml. of glacial acetic acid for four hours during which time the volume of the reaction solution is reduced to 75 ml. as acetic acid is slowly distilled off. On cooling the product crystallizes from solution. It is filtered off, washed with hexane, and air dried. Yield 2.8 g. The compound is dissolved in 100 ml. of acetone. The solution is treated with charcoal and filtered. Evaporation of the acetone gives 2.5 g. of the purified compound, M.P. 245°–247°.

*Analysis.*—Calculated for $C_{18}H_{14}O_8$ (percent): C, 60.34; H, 3.92. Found (percent): C, 60.56; H, 4.17.

EXAMPLE XIV

One ply laminate from 4,4'-diacetoxydiphenyl-3,3'-dicarboxylic acid 4,4'-diacetoxydiphenyl-3,3'-dicarboxylic acid (0.2 g.) is treated with 5 drops of dimethylacetamide to produce a paste which is then spread on both sides of a piece of glass cloth, 1″ x 1″, weighing 0.17 g. The sample is placed between two pieces of aluminum foil (treated with Simonize wax as a release agent). This "sandwich" is placed between two heated plates at a pressure of 9 lbs./in.[2] for 42 minutes beginning at 170 C. and gradually increased to 268°. The weight of the laminate is 0.251 g. with a resin content of 0.81 g.

EXAMPLE XV

Polymerization of 4,4'-dihydroxydiphenyl-3,3'-dicarboxylic acid chloride in molten benzophenone 4,4'-dihydroxydiphenyl-3,3'-dicarboxylic acid (0.52 g., 0.00167 mole) is dissolved in 100 g. of molten benzophenone at 100° C. The solution is heated and stirred at 100–130° C. in a 250 ml. flask under a slow stream of nitrogen. The evolved hydrogen chloride is absorbed in water and titrated with N/10 NaOH. A total of 30.45 ml. of base is used over a four day period indicating a conversion of 91%. The solution at this point is a clear liquid, with no precipitated polymer visible. The solution is cooled to 50° and diluted with a liter of hexane. The precipitated white polymer, 0.5 g., is extracted with benzene in a Soxhlet apparatus for 20 hours, then vacuum dried at 60°/0.02 mm. for 20 hours. The polymer is soluble in dimethylacetamide. Its inherent viscosity in DMAC at 0.5% conversion is 0.07.

EXAMPLE XVI 2,5-dihydroxyterephthalic acid chloride

One gram of 2,5-dihydroxyterephthalic acid chloride and 40 ml. of thionyl chloride are dissolved in 250 ml. of refluxing diethylether for 4 days. The ether is then distilled off. Almost all of the residue is soluble in hot hexane. The hexane solution is filtered. The product crystallizes from hexane on cooling. The product is purified by two further crystallizations from hexane. Yield 0.6 g. The compound is then sublimed, M.P. 136–138°.

*Analysis.*—Calculated for $C_8H_4O_4Cl_2$ (percent): C, 40.87; H, 1.71; Cl, 30.20. Found (percent): C, 40.43; H, 1.81; Cl, 29.54.

EXAMPLE XVII

Polymerization of 2,5-dihydroxyterephthalic acid chloride in diphenylether 2,5-dihydroxyterephthalic acid (0.859 g., 0.00365 mole) is dissolved in 30 ml. of diphenylether. The reaction is heated in a nitrogen stream at 100–200° for 91 hours and at 150–180° for 96 hours. The evolved HCl is absorbed in water and titrated with N/10 sodium hydroxide. A total of 0.00568 mole of HCl are titrated indicating a conversion of 78%. The polymer is filtered off, washed with boiling toluene, and vacuum dried at 100°/0.05 m. for 24 hours.

EXAMPLE XVIII

Preparation of 2,5-diacetoxyterephthalic acid 2,5-dihydroxyterephthalic acid (5.1 g.) is refluxed with 100 ml. of acetic anhydride for about one hour. The excess acetic anhydride and acetic acid produced during the reaction are removed by distillation. The residue, 8.9 g. (still moist with unremoved solvent) is treated with 150 ml. of boiling toluene. The insoluble unreacted starting material is filtered off. The toluene solution is treated with charcoal and filtered. The filtrate is concentrated by boiling below a volume of 60 ml., but no precipitation occurs. The compound is obtained by evaporation of the remaining solvent. The product is recrystallized from glacial acetic acid. Yield, 2.8 g. The crystals are washed with hot hexane and vacuum dried at 60° for 48 hours at 0.05 mm.

*Analysis.*—Calculated for $C_{12}H_{10}O_8$ (percent): C, 51.07; H, 3.55. Found (percent): C, 50.73; H, 3.68.

EXAMPLE XIX

Polymerization of 2,5-diacetoxyterephthalic acid in o-terephenyl

One gram of 2,5-diacetoxyterephthalic acid is dissolved in 50 ml. of o-terephenyl (recrytallized from hexane) in a 250 ml. three necked flask. The solution is heated and stirred in a nitrogen stream at 200° C. for 120 hours. The polymer is filtered off and washed with hot hexane. It is extracted with acetone in a Soxhlet apparatus for 42 hours. The product is dried in a vacuum oven at 110° for 24 hours at 0.04 mm. Yield 0.85 g.

*Analysis.*—Calculated for $(C_8H_2O_4)_n$ (percent): C, 59.35; H, 1.24; O, 39.4. Found (percent): C, 57.31; H, 2.54; O, 40.43.

EXAMPLE XX.—PREPARATION OF ONE PLY LAMINATES FROM 2,5-DIACETOXYTEREPHTHALIC ACID

| Temp. (° C) | | Time (min.) | Solvent (DMAC) | Glass cloth (g.) | Laminate weight after curing (g.) | Resin content (g.) |
|---|---|---|---|---|---|---|
| Begin | End | | | | | |
| 260 | 307 | 15 | None | 0.238 | 0.358 | 0.120 |
| 256 | 298 | 17 | ___do___ | 0.160 | 0.253 | 0.093 |
| 220 | 310 | 10 | 4 drops | 0.180 | 0.293 | 0.113 |

EXAMPLE XXI

Polymerization of 4,4'-diacetoxydiphenylether-3,3'-dicarboxylic acid in molten benzophenone 4,4'-diacetoxydiphenylether-3,3'-dicarboxylic acid (2.0 g.) is dissolved in 100 g. of molten benzophenone. The solution is heated and stirred in a 250 ml. flask for 3 hours at 140°–160° under a slow stream of nitrogen. The evolved acetic acid is absorbed in water and titrated with N/10 NaOH. 56.0 ml. of base are used indicating a conversion of 52.5%. The "prepolymer" is precipitated with one liter of hexane, and filtered off. It is extracted with benzene in a Soxhlet apparatus for 20 hours and dried at 60°/0.02 mm. The product is soluble in tetrahydrofuran. Its inherent viscosity in THF at 0.5% concentration is 0.10.

EXAMPLE XXII

Polymerization of 4,4'-diacetoxydiphenylether-3,3'-dicarboxylic acid in triethylene glycol dimethyl ether.—Preparation of a prepolymer solution for lamination of glass cloth 4,4'-diacetoxydiphenylether-3,3'-dicarboxylic acid (2.0 g.) is dissolved in 60 ml. of triethylene glycol dimethylether in a 100 ml. flask. The solution is stirred and heated under a slow stream of dry nitrogen for 205 minutes beginning at a temperature of 80° C. and ending at 133°. The acetic acid evolved is swept out of the reaction vessel by the nitrogen stream, absorbed in water, and titrated with N/10 sodium hydroxide. The 54.7 ml. of base used indicates that 50.5% of the acetyl groups have been removed during the reaction, and at this point, the "prepolymer" solution is reduced in volume to 5 ml. under reduced pressure (30 mm.) at 90°. Two 1" x 1" 3 ply laminates are prepared from this "prepolymer" solution using the following procedure:

Three pieces of 1" x 1" glass cloth are treated on both sides with the viscous prepolymer solution and pressed together. The solvent is removed by placing the "sandwich" in a vacuum pistol at 100°/0.02 mm. This process is repeated until the resin content is above 35%. The "sandwich" is placed between two preheated aluminum plates at the pressures and temperatures indicated below:

| Temp. (° C.) | | Pressure (p.s.i.) | | Time (mins.) | Glass cloth (g.) | Laminate weight after curing (g.) | Resin content (g.) |
|---|---|---|---|---|---|---|---|
| Begin | End | Begin | End | | | | |
| 150 | 240 | 9 | 9 | 175 | 0.535 | 0.980 | 0.445 |
| 70 | 228 | 38 | 125 | 420 | 0.580 | 0.928 | 0.348 |

Both small laminates exhibit good surface continuity when observed under a microscope at a magnification of 30 diameters.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A film-forming polymer consisting essentially of repeating units selected from the class consisting of:

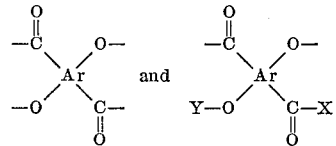

wherein each of the —O— radicals is paired in ortho or peri position with a C=O group, Ar is a tetravalent aromatic radical selected from the class consisting of: $>C_6H_2<$; $>C_{14}H_6<$; $>C_{10}H_4<$; $>C_6H_3-C_6H_3<$; $>C_6H_3-Z-C_6H_3<$ and

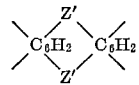

nuclear substituted derivatives thereof in which there are no more than two derivative groups and each said derivative group is selected from the class consisting of Br, Cl, I and R; and fluoro derivatives thereof in which at least one and as many as all of the hydrogens attached to carbon are replaced by fluorine;

Z is a divalent radical selected from the class consisting of —O—;

—S—; —OSi(R)$_2$O—; —Si(R)$_2$—; —Si(OR)$_2$—; —SO$_2$—;

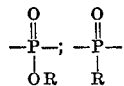

—R'—; —NH— and —N(R)—;
the two Z' groups of said formula being positioned ortho to each other in each said >C$_6$H$_2$< nucleus and each Z' representing a divalent radical of the class consisting of —O—;

—S—; —NH—; —N(R)— and —R'—;
R is a monovalent hydrocarbon radical having no more than 12 carbon atoms;
R' is a divalent aliphatic hydrocarbon radical of 1–6 carbon atoms;
X is a radical selected from the class consisting of: hydroxy, chlorine, bromine, iodine and OR; and
Y is a radical selected from the class consisting of: hydrogen and acyloxy radical of the formula

and R being as defined above.

2. A polymer of claim 1 in which said Ar is >C$_6$H$_2$<.
3. A polymer of claim 1 in which said Ar is

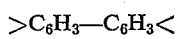

4. A polymer of claim 1 in which said repeating unit has the formula

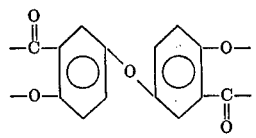

5. A polymer of claim 1 in which said repeating unit has the formula

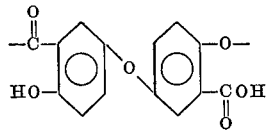

6. A polymer of claim 1 in which said repeating unit has the formula

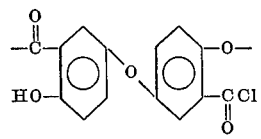

7. A polymer of claim 1 in which said repeating unit has the formula

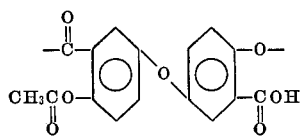

8. A polymer of claim 1 in which said repeating unit has the formula

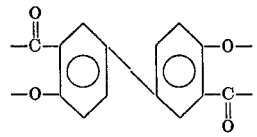

9. A polymer of claim 1 in which said repeating unit has the formula

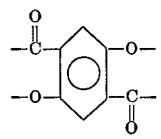

10. A polymer of claim 1 in which said repeating unit has the formula

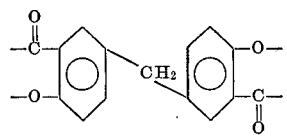

11. A polymer of claim 1 in which said repeating unit has the formula

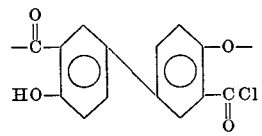

12. A polymer of claim 1 in which said repeating unit has the formula

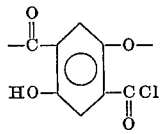

13. A polymer of claim 1 in which said repeating unit has the formula

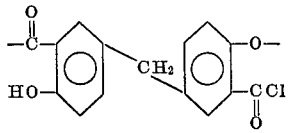

14. A polymer of claim 1 in which said Ar is

C$_6$H$_3$—Z—C$_6$H$_3$

References Cited

UNITED STATES PATENTS

| | | | |
|---|---|---|---|
| 2,696,481 | 12/1954 | Schneider | 260—47 |
| 3,324,199 | 6/1967 | Tocker | 260—857 |
| 3,408,326 | 10/1968 | Errede | 260—47 |
| 3,438,938 | 4/1969 | Oxenrider et al. | 260—47 |

WILLIAM H. SHORT, Primary Examiner

L. M. PHYNES, Assistant Examiner

U.S. Cl. X.R.

161—182, 192; 260—30.2, 32.4, 32.6, 33.4, 33.8, 49, 75, 79